United States Patent [19]

Kriecha et al.

[11] Patent Number: 5,673,302
[45] Date of Patent: Sep. 30, 1997

[54] ADJUSTABLE X-RAY CASSETTE HOLDER AND LEAD BLOCKER DEVICE COMBINATION

[76] Inventors: Doretta L. Kriecha; James F. Kriecha, Jr., both of 7N319 Falcons Trail, St. Charles, Ill. 60175

[21] Appl. No.: 601,281

[22] Filed: Feb. 16, 1996

[51] Int. Cl.⁶ .................................. G03B 42/02
[52] U.S. Cl. .............. 378/167; 378/169; 378/172
[58] Field of Search ..................... 378/167, 169, 378/172, 173, 181, 182, 185, 187

[56] References Cited

U.S. PATENT DOCUMENTS

| | | | |
|---|---|---|---|
| 3,457,406 | 7/1969 | Reiniger. | |
| 4,132,897 | 1/1979 | Ohlson | 250/468 |
| 4,333,014 | 6/1982 | Renshaw | 250/521 |
| 4,476,569 | 10/1984 | Ogo | 378/175 |
| 4,542,522 | 9/1985 | Blais | 378/167 |
| 5,224,148 | 6/1993 | Baker, Jr. et al. | 378/181 |
| 5,349,628 | 9/1994 | Taniguruma et al. | 378/172 |
| 5,530,734 | 6/1996 | Jaeger | 378/172 |

*Primary Examiner*—Don Wong
*Attorney, Agent, or Firm*—Meroni & Meroni

[57] ABSTRACT

An adjustable X-ray cassette holder is provided. A lead blocker device is also provided for selective use with the X-ray cassette holder. A frame is adapted for supporting first and second cassette edges of the X-ray cassette. A pair of frame adjusters are slidably connected to the frame. A movable frame is adapted for supporting third and fourth cassette edges of the X-ray cassette. A pair of tension springs are interconnected between the movable frame and respective first and second frame adjusters. A lead blocker frame has lead blocker frame sides in adjacency the frame and movable frame. An X-ray shielding plate is mounted to the lead blocker frame and disposed in an adjacent to parallel planar relationship with an upper surface of the X-ray cassette.

20 Claims, 3 Drawing Sheets

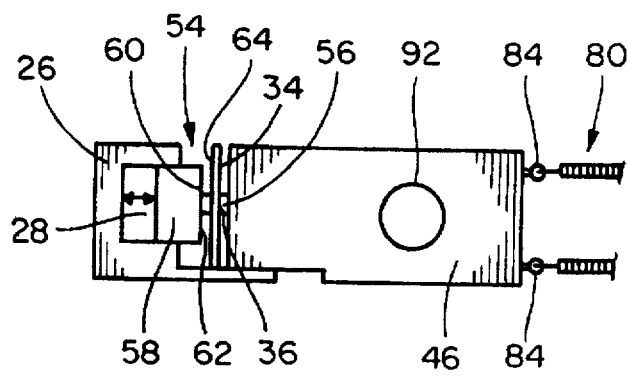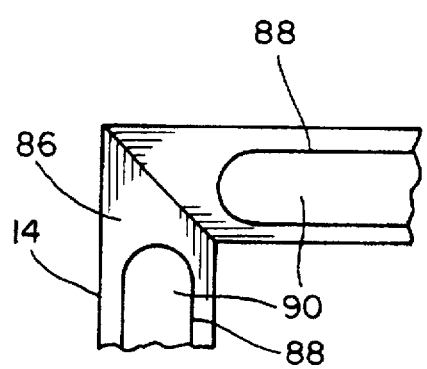
Fig. 5  Fig. 6
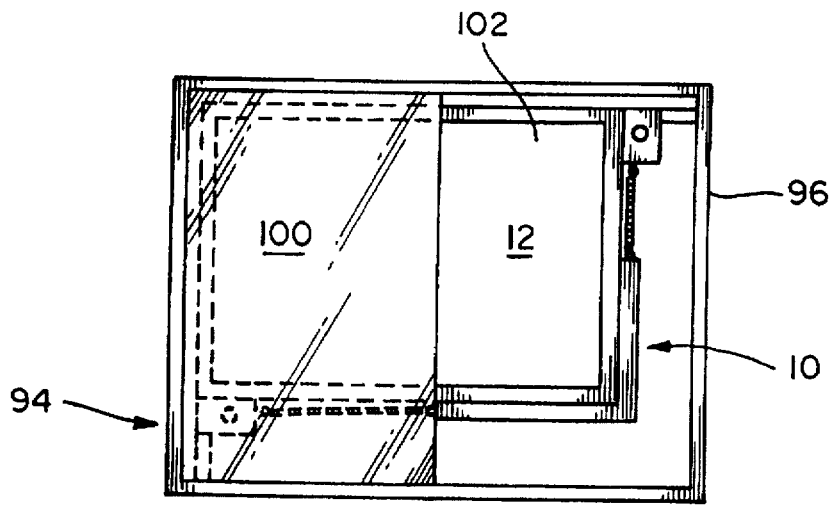
Fig. 7
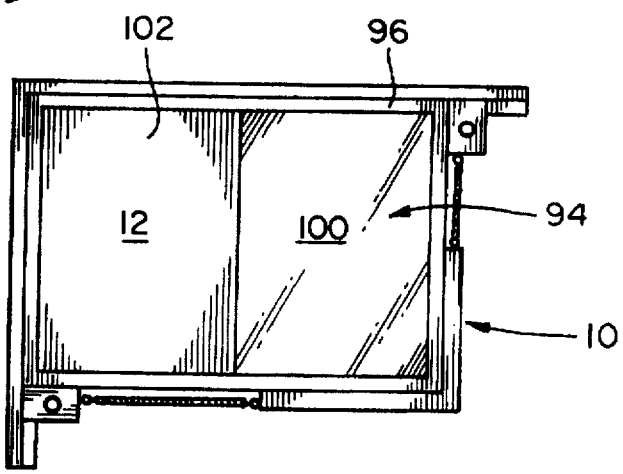
Fig. 8

5,673,302

ADJUSTABLE X-RAY CASSETTE HOLDER AND LEAD BLOCKER DEVICE COMBINATION

BACKGROUND OF THE INVENTION

1. Field of the Invention

The present invention relates generally to a device for holding X-ray cassettes. More particularly, the invention pertains to an adjustable X-ray cassette holder device for securely positioning X-ray cassettes of different sizes and selectably in combination with a lead blocker device for selectively shielding portions the X-ray cassette from exposure to X-rays.

2. Description of the Prior Art

In the field of radiography, X-ray machines used both in the medical and veterinary fields commonly utilize large rectangular table-tops for supporting the person or animal to be examined. During the X-ray exam, an X-ray cassette is positioned on the table top and underneath that portion of the person or animal to be studied.

It is important that during the fraction of a second while the X-ray tube is being operated, the X-ray cassette is securely positioned to prevent movement. Any movement during operation increases the probability of a blurred image requiring additional X-ray exposures. When animals and/or humans are being X-rayed, there is often movement that occurs which tends to move an X-ray cassette making it more difficult if not impossible to obtain proper X-rays, particularly with less expensive X-ray machines that are widely used in veterinary clinics, it being financially difficult for veterinarians to afford more expensive equipment. Our invention is concerned with an attachment type X-ray cassette holder that is of a universal construction that enables it be used with many different types of X-ray machines that are commonly in use in the United States and elsewhere.

Various attempts have been made in the art to provide X-ray cassette holders to hold an X-ray cassette in place during exposure to X-rays. For example, U.S. Pat. No. 3,457,406, issued to Reiniger, discloses a self adjusting film magazine holder having a two-armed yoke which can pivot about a spindle with each free end of which is connected to a ledge so that, when the yoke is pivoted, the ledges more toward one another to secure the magazine therebetween. While this device serves to provide a satisfactory X-ray cassette holder, it suffers from the disadvantage of having a numerous components and pivoting points which increases both the cost of manufacturing and the probability of breakdown.

It has been found desirous to make a selected number of radiographic exposures on a single film or cassette. X-ray cassettes are often large enough to easily accommodate two side-by-side exposures. However, during an X-ray exam, prior art X-ray cassette holders expose the entire cassette to X-rays allowing for only one exposure per cassette.

U.S. Pat. No. 4,476,569, issued to Ogo, discloses an X-ray field defining mask. A cassette assembly is mounted for reciprocating in a runnel between an X-ray exposure position and a position in which the cassette is automatically unloaded or loaded with film. Field defining masks are mounted for translating selectively with the carriage. While this device serves to provide a means for creating a number of exposures on a single cassette, it suffers from the disadvantages of having a complicated design and being unable to operate an a table-top surface.

What is needed in the art is a simplified X-ray cassette holder and lead blocker device that has a simplified design and construction for securely positioning X-ray cassettes of different sizes on an X-ray machine table-top and selectively shielding portions the X-ray cassette from exposure to X-rays to allow for multiple exposures.

As will be described in greater detail hereinafter, the X-ray cassette holder and lead blocker device of the present invention differs from those previously proposed and employs a number of novel features that render it highly advantageous over the aforementioned prior art.

SUMMARY OF THE INVENTION

Accordingly, it is an object of this invention to provide a combination X-ray cassette holder with or without a lead blocker device to securely position an X-ray cassette on a table-top and allow for multiple exposures.

Another object of this invention is to provide X-ray cassette holder and lead blocker device of a construction that lends itself to being used with a variety of different types of commonly used presently existing X-ray machines to avoid equipment replacement costs to update existing X-ray machines.

Still another object of this invention is to provide X-ray cassette holder adapted to hold X-ray cassettes of varied sizes or shapes on a variety of different X-ray machines now in common use in the United States and elsewhere.

Yet another object of this invention is to provide X-ray cassette holder in which the X-ray cassette may be easily and quickly inserted and removed.

To achieve the foregoing and other objectives, and in accordance with the purposes of the present invention an adjustable X-ray cassette holder and lead blocker device is provided. The device comprises a time adapted for supporting first and second cassette edges of the X-ray cassette. A pair of frame adjusters are slidably connected to the frame. A movable frame is adapted for supporting third and fourth cassette edges of the X-ray cassette. A pair of tension springs are interconnected between the movable frame and respective first and second frame adjusters. A lead blocker frame has lead blocker frame sides in adjacency with the frame and movable frame. An X-ray shielding plate is mounted to the lead blocker frame and disposed in an adjacent parallel planar relationship with an upper surface of the X-ray cassette.

Other objects, features and advantages of the invention will become more readily apparent upon reference to the following description when taken in conjunction with the accompanying drawings, which drawings illustrate several embodiments of the invention.

BRIEF DESCRIPTION OF THE DRAWINGS

In the drawings:

FIG. 5 is a partial side view of the X-ray cassette holder of the present invention;

FIG. 6 is a partial bottom view of the X-ray cassette holder of the present invention;

FIG. 7 is a diagrammatic top view of lead blocked device used in combination with the X-ray cassette holder in one embodiment of the present invention; and FIG. 8 is a diagrammatic top view of lead blocked device used in combination with the X-ray cassette holder in an alternative embodiment of the present invention.

DETAILED DESCRIPTION OF THE PREFERRED EMBODIMENT

Figure 1:
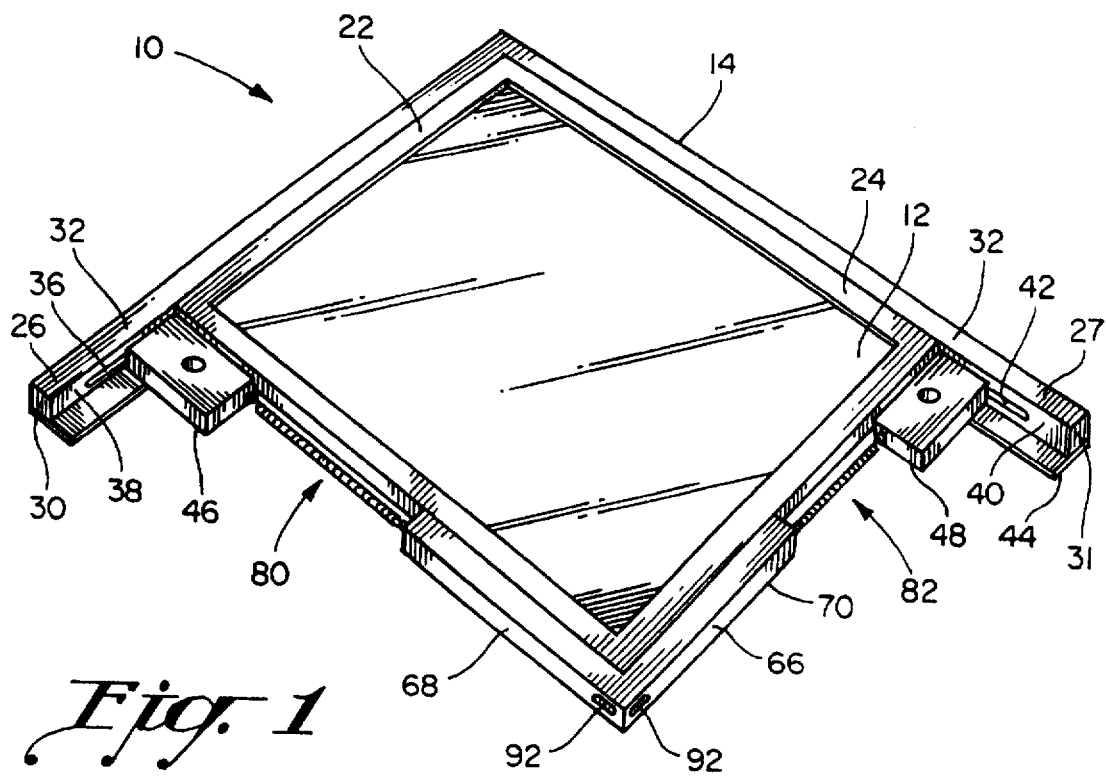
FIG. 1 is a perspective view of the X-ray cassette holder of the present invention.

Referring now to the drawings, an adjustable X-ray cassette holder 10 is shown in FIG. 1. The holder 10 is adjustable to secure X-ray cassettes or films 12 of varied sizes and shapes.

An L-shaped frame 14 has a first frame member 16 disposed perpendicular to a second frame member 18. The first frame member 16 and second frame member 18 each have a ledge 20 for supporting a first cassette edge 22 and second cassette edge 24 of the X-ray cassette 12, with the combined ledges forming an L-shape.

The first frame member 16 and second frame member 18 preferably have upper C-shaped portions 26, 27 defining an elongated channel 28, as best illustrated in FIG. 5. End caps 30, 31 are located on opposite ends 32 of the frame 14. A first face plate 34 having a first elongated slot 36 is mounted to and extends along an inner side 38 of the first frame member 16. A second face plate 40 having a second elongated slot 42 is mounted to and extends along an inner side 44 of the second frame member 18.

Figure 3:
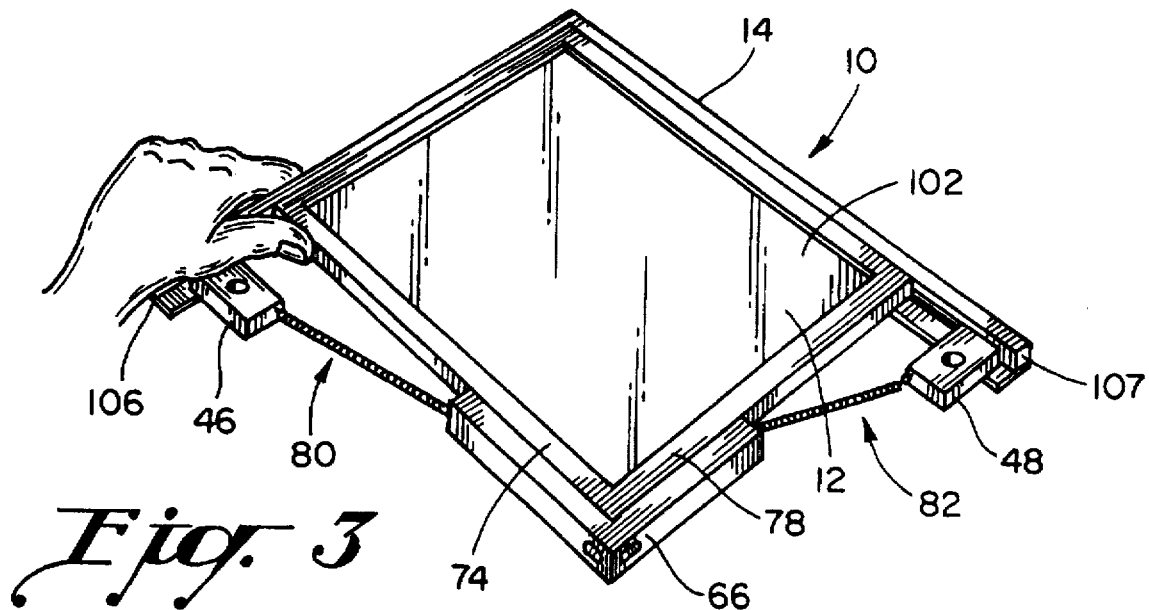
FIG. 3 is a perspective view of the X-ray cassette holder of the present invention.

First and second frame adjusters 46, 48 are provided having front ends 50, 51 and back ends 52, 53. The front ends 50, 51 have slide members 54 including a sliding rail 56 and a retainer end 58. Slide members 54 of the first and second frame adjusters 46, 48 slidably engage the first and second elongated slots 36, 42, respectively, as shown in FIGS. 3 and 5. A rubber surface 60 may be applied to an inner surface 62 of the retainer end 58 which confronts an inner face plate surface 64 so that the frame adjusters 46, 48 will frictionally engage the frame 14 to provide for secured positioning.

Figure 4:
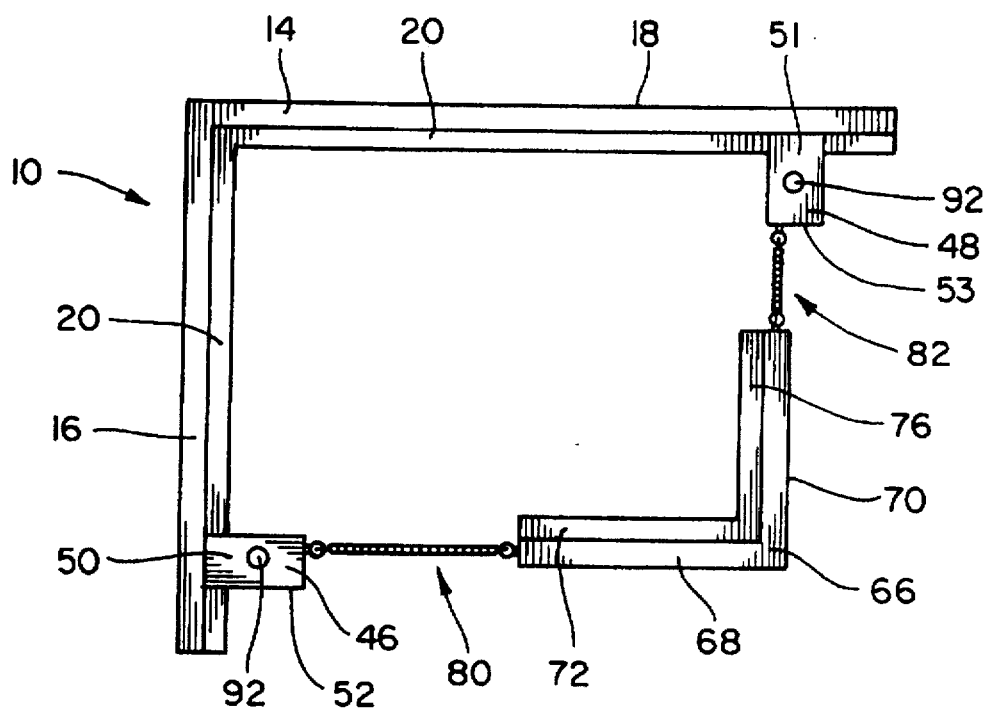
FIG. 4 is a top plan view of the X-ray cassette holder of the present invention.

Referring to FIGS. 1 and 4, an L-shaped movable frame 66 has a first portion 68 disposed perpendicular to a second portion 70. The first portion 68 being disposed parallel to the second frame member 18 and having a first ledge portion 72 for supporting a third cassette edge or side portion 74 of the X-ray cassette 12. The second portion 70 being disposed parallel to the first frame member 16 and having a second ledge portion 76 for supporting a fourth cassette edge or side portion 78 of the X-ray cassette 12, with the combined ledges forming an L-shape. Preferably, the frame 14, movable frame 66, and frame adjusters 46, 48 are formed of injection molded PVC plastic.

A pair of first tension springs 80 are interconnected between the back end 52 of first frame adjuster 46 and the first portion 68 of the movable frame 66. A pair of second tension springs 82 are interconnected between the back end 53 of the second frame adjuster 48 and the second portion 70 of the movable frame 66. Preferably, the tension springs are mounted in vertical alignment and attached with eye screws 84, as best illustrated in FIG. 5. However, it is to be understood that other types of springs or biasing means could be used.

Referring to FIG. 6, a bottom surface 86 of the frame 14 has elongated inset surfaces 88. Non-slip rubber 90 of conventional use is inset into the inset surfaces and secured by appropriate means, such as adhesive. The non-slip rubber 90 extends above the surface of the frame 14 for providing secured non-slip positioning of the frame on an X-ray table surface. A bottom surface of the movable frame 66 is also provided with non-slip rubber in a similar fashion. Circular inset grip surfaces 92 are provided on the first and second frame adjusters 46, 48 and the movable frame 66 to aid in the movement or manipulation by being adapted to receive a finger tip of the user.

Figure 2:
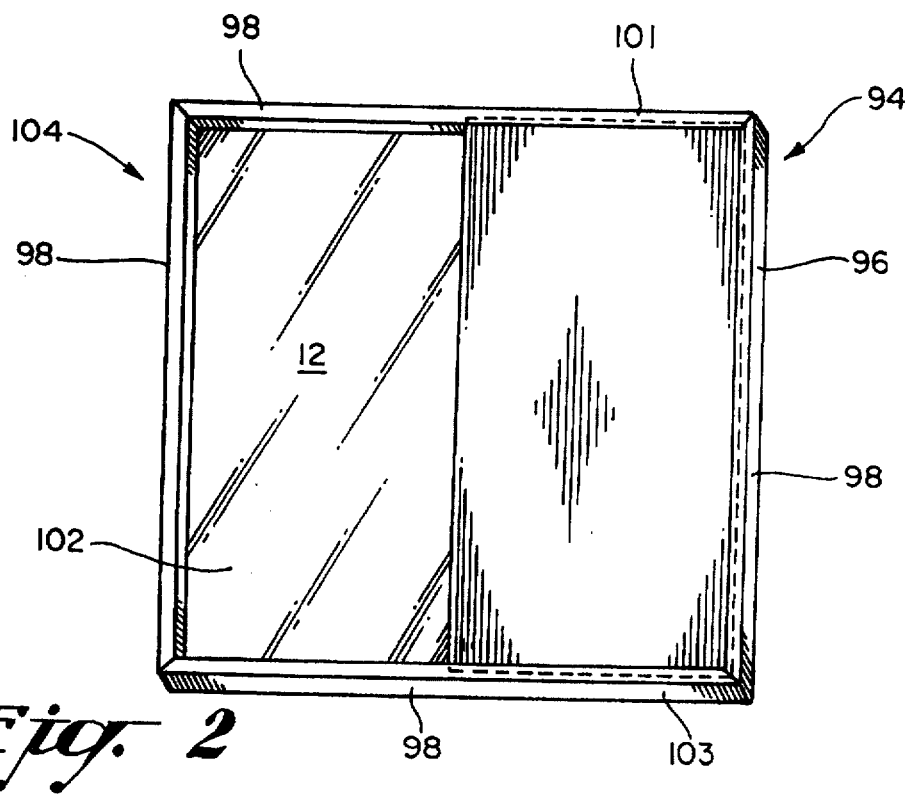
FIG. 2 is a perspective view of the lead blocker device of the present invention.

Referring to FIG. 2, a lead blocker device or cassette cover 94 is provided. The cover 94 includes a rectangular lead blocker frame 96 having lead blocker frame sides 98. In one embodiment illustrated in FIG. 7, the frame sides 98 are of sufficient length so that the cover 94 may be inserted over the holder 10 to conceal the holder 10. In an alternative embodiment illustrated in FIG. 8, the frame sides 98 are of sufficient length to allow the cover 94 to be inserted over the X-ray cassette 12. In both embodiments, the frame sides 98 will be in adjacency with the frame and movable frame.

An X-ray shielding plate 100 is mounted to the lead blocker frame 96 between opposite lead blocker frame sides 101, 103 and disposed in an adjacent parallel planar relationship with an upper surface 102 of the X-ray cassette 12 to shield a portion of the X-ray cassette 12 from exposure to X-rays. The lead blocker frame 96 and X-ray shielding plate 100 define a rectangular X-ray window 104 adjacent with the upper surface 102 of the X-ray cassette allowing X-rays to pass therethrough. It is to be understood that the shielding plate 100 may be shaped in alternative configurations to provide desired shielding. In a preferred embodiment shown in FIG. 2, the shielding plate 100 covers one half of the X-ray cassette 12 to allow for separate exposures on a single X-ray cassette 12.

In operation, the first and second frame adjusters 46, 48 are positioned to the widest setting so that the adjusters 46, 48 are towards outer ends 106, 107 of the frame 14, as shown in FIG. 3. The X-ray cassette 12 is inserted into the frame 14. The movable frame 66 is then pulled out past the X-ray cassette 12 to engage third and fourth cassette edges 74, 78. The adjusters 46, 48 are then moved up against the X-ray cassette, as shown in FIG. 1. The frames having inner confronting faces in edgewise engagement with an outer perimeter of the X-ray cassette. The springs being yieldable to enable the device to be assembled with X-ray cassettes of different sizes with longer and shorter inner confronting faces. If X-ray shielding is desired, the cover 94 may be inserted either over the X-ray cassette prior to engagement with the frame 14, as previously described for one embodiment, or inserted over the assembled holder in the alternative embodiment.

Although the invention has been described by reference to some embodiments it is not intended that the novel device be limited thereby, but that modifications thereof are intended to be included as falling within the broad scope and spirit of the foregoing disclosure, the following claims and the appended drawings.

We claim:

1. An adjustable X-ray cassette holder device for securely positioning X-ray cassettes of different sizes, comprising:

(a) an L-shaped frame having a first frame member disposed perpendicular to a second frame member, the first frame member and second frame member each having a ledge for supporting first and second cassette edges of the X-ray cassette;

(b) a first frame adjuster slidably connected to the first frame member;

(c) a second frame adjuster slidably connected to the second frame member;

(d) an L-shaped movable frame having a first portion disposed perpendicular to a second portion, the first portion being disposed parallel to the second frame member and having a first ledge portion for supporting a third cassette edge of the X-ray cassette, the second portion being disposed parallel to the first frame member and having a second ledge portion for supporting a fourth cassette edge of the X-ray cassette;

(e) first tension means interconnected between the first frame adjuster and the L-shaped movable frame for producing tension between the first frame adjuster and the L-shaped movable frame when the first frame adjuster and the L-shaped movable frame are moved in opposite directions; and (f) second tension means interconnected between the second frame adjuster and the L-shaped movable frame for producing tension between the second frame adjuster and the L-shaped movable frame when the second frame adjuster and the L-shaped movable frame are moved in opposite directions.

2. The device of claim 1, further comprising X-ray shielding means disposed adjacent to an upper surface of the X-ray cassette for selectively shielding a portion of the X-ray cassette from exposure to X-rays.

3. The combination of claim 2, wherein the first frame member has an elongated first slot extending along an inner side of the first frame member, the second frame member has an elongated second slot extending along an inner side of the second frame member, the first frame adjuster has a projecting first slide member slidably engaging the elongated first slot, and the second frame adjuster slidably engaging second slide member slidably engaging the elongated second slot.

4. The combination of claim 3, wherein the first tension means includes a first tension spring interconnected between the first frame adjuster and the first portion of the movable frame, and a second tension spring interconnected between the second frame adjuster and the second portion of the movable frame.

5. The combination of claim 1, further comprising first non-slip means connected to a bottom surface of the frame for providing secured non-slip positioning of the frame on an X-ray table surface, and second non-slip means connected to a bottom surface of the movable frame for providing secured non-slip positioning of the movable frame on an X-ray table surface.

6. The combination of claim 2, wherein the X-ray shielding means includes a lead blocker frame having lead blocker frame sides in adjacency with the frame and movable frame, and an X-ray shielding plate mounted to the lead blocker frame and being disposed in an adjacent parallel planar relationship with an upper surface of the X-ray cassette, the lead blocker frame and X-ray shielding plate defining a rectangular X-ray window adjacent with the upper surface of the X-ray cassette allowing X-rays to pass therethrough.

7. An adjustable X-ray cassette holder and lead blocker device for securely positioning X-ray cassettes of different sizes and selectively shielding portions the X-ray cassette from exposure to X-rays, comprising in combination:

(a) a frame having a first frame member disposed perpendicular to a second frame member, the first frame member and second frame member each having a ledge for supporting first and second cassette edges of the X-ray cassette;

(b) a first frame adjuster slidably connected to the first frame member;

(c) a second frame adjuster slidably connected to the second frame member;

(d) a movable frame having a first portion disposed perpendicular to a second portion, the first portion being disposed parallel to the second frame member and having a first ledge portion for supporting a third cassette edge of the X-ray cassette, the second portion being disposed parallel to the first frame member and having a second ledge portion for supporting a fourth cassette edge of the X-ray cassette;

(e) first tension means interconnected between the first frame adjuster and the movable frame for producing tension between the first frame adjuster and the movable frame when the first frame adjuster and the movable frame are moved in opposite directions;

(f) second tension means interconnected between the second frame adjuster and the movable frame for producing tension between the second frame adjuster and the movable frame when the second frame adjuster and the movable frame are moved in opposite directions;

(g) a lead blocker frame having lead blocker frame sides in adjacency with the frame and movable frame; and (h) an X-ray shielding plate mounted to the lead blocker frame between opposite lead blocker frame sides and being disposed in an adjacent parallel planar relationship with an upper surface of the X-ray cassette.

8. The combination of claim 7, wherein the frame and movable frame are L-shaped.

9. The combination of claim 8, wherein the first frame member has an elongated first slot extending along an inner side of the first frame member, the second frame member has an elongated second slot extending along an inner side of the second frame member, the first frame adjuster has a projecting first slide member slidably engaging the elongated first slot, and the second frame adjuster has a projecting second slide member slidably engaging the elongated second slot.

10. The combination of claim 9, wherein the first tension means includes a first tension spring interconnected between the first frame adjuster and the first portion of the movable frame, and a second tension spring interconnected between the second frame adjuster and the second portion of the movable frame.

11. The combination of claim 8, further comprising first non-slip means connected to a bottom surface of the frame for providing secured non-slip positioning of the frame on an X-ray table surface, and second non-slip means connected to a bottom surface of the movable frame for providing secured non-slip positioning of the movable frame on an X-ray table surface.

12. The combination of claim 7, wherein the lead blocker frame and X-ray shielding plate define a rectangular X-ray window adjacent with the upper surface of the X-ray cassette allowing X-rays to pass therethrough.

13. An adjustable X-ray cassette holder device for securely positioning an X-ray cassette, comprising:

(a) an L-shaped frame having first and second frame members disposed perpendicular to one another and adapted to receive two sides of the X-ray cassette;

(b) an L-shaped movable frame having first and second frame portions disposed perpendicular to one another and adapted to receive two side portions of the X-ray cassette;

(c) first adjustment means for movably securing the first frame portion of the L-shaped movable frame to the first frame member of the L-shaped frame; and (d) second adjustment means for movable securing the second frame portion of the L-shaped movable frame to the second frame member of the L-shaped frame.

14. The device of claim 13, further comprising X-ray shielding means disposed adjacent to an upper surface of the X-ray cassette for selectively shielding a portion of the X-ray cassette from exposure to X-rays.

15. The device of claim 13, wherein the first adjustment means includes a first frame adjuster slidably connected to the first frame member and a first tension spring interconnected between the first frame adjuster and the first portion of the movable frame, and the second adjustment means includes a second frame adjuster slidably connected to the second frame member and a second tension spring interconnected between the second frame adjuster and the second portion of the movable frame.

16. The device of claim 15, wherein the first frame member has an elongated first slot extending along an inner side of the first frame member, the second frame member has an elongated second slot extending along an inner side of the second frame member, the first frame adjuster has a projecting first slide member slidably engaging the elongated first slot, and the second frame adjuster has a projecting second slide member slidably engaging the elongated second slot.

17. The device of claim 13, further comprising first non-slip means connected to a bottom surface of the frame for providing secured non-slip positioning of the frame on an X-ray table surface, and second non-slip means connected to a bottom surface of the movable frame for providing secured non-slip positioning of the movable frame on an X-ray table surface.

18. The device of claim 14, wherein the X-ray shielding means includes a lead blocker frame having lead blocker frame sides in adjacency with the frame and movable frame, and an X-ray shielding plate mounted to the lead blocker frame and being disposed in an adjacent parallel planar relationship with an upper surface of the X-ray cassette, the lead blocker frame and X-ray shielding plate defining an X-ray window adjacent with the upper surface of the X-ray cassette allowing X-rays to pass therethrough.

19. An adjustable X-ray cassette holder device for secured disposition about an outer perimeter of an X-ray cassette, comprising:
(a) a frame having inner L-shaped ledges, the frame having first and second frame members disposed perpendicular to one another and adapted to receive two sides of the X-ray cassette;
(b) a movable frame having inner L-shaped ledges, the movable frame having first and second frame portions disposed perpendicular to one another and adapted to receive two side portions of the X-ray cassette;
(c) first adjustment means for movably securing the first frame portion L-shape L-shaped movable frame to the first frame member of the L-shaped frame, the first adjustment means including a first frame adjuster slidably connected to the first frame member and a first tension spring interconnected between the first frame adjuster and the first portion of the movable frame; and
(d) second adjustment means for movable securing the second frame portion of the L-shaped movable frame to the second frame member of the L-shaped frame, the second adjustment means including a second frame adjuster slidably connected to the second frame member and a second tension spring interconnected between the second frame adjuster and the second portion of the movable frame.

20. The device of claim 19, in combination with a parallel sided X-ray cassette, said frames having inner confronting faces in edgewise engagement with an outer perimeter of said X-ray cassette, the springs being yieldable to enable the device to be assembled with X-ray cassettes of different sizes with longer and shorter inner confronting faces.

* * * * *